(12) United States Patent
Swartzendruber et al.

(10) Patent No.: US 6,837,032 B1
(45) Date of Patent: Jan. 4, 2005

(54) PEDAL ACTUATED HEIGHT ADJUSTMENT MECHANISM FOR A MOWER CUTTING DECK

(75) Inventors: James Allen Swartzendruber, West Bend, WI (US); Brian George Held, Horicon, WI (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 09/638,991

(22) Filed: Aug. 15, 2000

(51) Int. Cl.[7] .................................................. A01D 34/74
(52) U.S. Cl. ..................... 56/14.9; 56/17.1; 56/DIG. 22
(58) Field of Search ................. 56/12.7, 14.7, 56/14.9, 15.7, 15.8, 15.9, 16.3, 16.7, 17.1, DIG. 22, 1, 320.1

(56) References Cited

U.S. PATENT DOCUMENTS

| | | | |
|---|---|---|---|
| 2,945,338 A | * 7/1960 | Burrows et al. | 56/DIG. 22 |
| 3,608,288 A | * 9/1971 | Heth et al. | 56/15.8 |
| 3,706,188 A | * 12/1972 | Quiram | 56/15.8 |
| 4,120,136 A | * 10/1978 | Rose | 56/17.1 |
| 4,291,522 A | 9/1981 | Kawasaki et al. | 56/15.8 |
| 4,577,455 A | * 3/1986 | Amano et al. | 56/17.1 |
| 4,679,382 A | * 7/1987 | Saruhashi et al. | 56/14.7 |
| 4,760,687 A | 8/1988 | Siegrist | 56/15.8 |
| 4,869,057 A | 9/1989 | Siegrist | 56/15.9 |
| 5,062,510 A | * 11/1991 | Shimizu | 192/220.1 |
| 5,138,825 A | 8/1992 | Trefz et al. | 56/11.1 |
| 5,142,850 A | 9/1992 | Patterson et al. | 56/17.1 |
| 5,187,925 A | 2/1993 | Patterson et al. | 56/17.1 |
| 5,238,267 A | * 8/1993 | Hutchison et al. | 56/17.1 |
| 5,351,467 A | 10/1994 | Trefz et al. | 56/16.3 |
| 5,381,648 A | 1/1995 | Seegert et al. | 56/17.1 |
| 5,784,870 A | * 7/1998 | Seegert et al. | 56/320.1 |
| 5,816,033 A | * 10/1998 | Busboom et al. | 56/17.1 |
| 5,865,020 A | * 2/1999 | Busboom et al. | 56/320.1 |
| 5,927,055 A | 7/1999 | Ferree et al. | 56/15.9 |
| 5,970,690 A | 10/1999 | Toman | 56/7 |
| 6,122,903 A | * 9/2000 | Hayashi et al. | 56/15.8 |

OTHER PUBLICATIONS

Deere & Company, John Deere Mulching Systems, of pp. 1–8, see particularly page 7, date of publication—Jan. 1998, published in U.S.A.
Copies of photos by Deere & Co. employees, copies of eight (8) photos of SCAG Turf Tiger Mower, date of publication—Aug. 2000, published in U.S.A.

* cited by examiner

Primary Examiner—Robert E. Pezzuto
Assistant Examiner—Nathan Mammen (57) ABSTRACT

A lockable lift assembly for controlling the height of a mower cutting deck is provided. The assembly includes a pedal actuated system including a rockshaft extending the width of the mower frame and having plates on which the deck is carried as a change in height is either performed or maintained. Intermediate these extensions is a toothed plate which cooperates with a handle operated latching system to permit a user to fixedly control the height of the cutting deck. Joint use of the pedal and latching system enables placement of the deck in a position wherein the deck is raised above the highest heighth of cut for travel across the ground or, alternatively, in a removal position in which the deck may be securely and quickly detached from the mower.

12 Claims, 8 Drawing Sheets

PEDAL ACTUATED HEIGHT ADJUSTMENT MECHANISM FOR A MOWER CUTTING DECK

BACKGROUND OF THE INVENTION

1. Field of the Invention

The present invention relates to height adjustable mower cutting decks, and more specifically, to structure permitting the adjustment of such decks between a locked and unlocked position.

2. Description of Related Art

Vegetation cutting implements such as mounted cutting decks are typically carried by riding mowers having structure allowing adjustment of those decks between a range of heights above ground level. Ordinarily, the range extends between a position at or below the lowest available cut height to a position at or above the highest available cut height. Adjustment to a position below the cut heighth range is frequently preferred for ease in removal of the deck from the mower since the deck is that much closer to the ground surface. Alternatively, adjustment above the cut heighth range is favored to permit the deck to clear obstacles encountered while travelling across the ground.

Adjustment of the cutting decks is presently accomplished by various structure including hand-operated levers and bars positioned in the vicinity of the mower's seating apparatus. These structures require an operator to either push or pull on the levers or bars in order to adjust the deck. Exertion of force in either of these manners is often strenuous and tiring requiring the user to gather a certain amount of upper body strength to obtain any adjustment of the deck. Additionally, such exertion may cause an operator injury due to strain resulting from the operator being pulled from or out of the seating apparatus. Even more simply, having to either push or pull on the above structure is inherently uncomfortable because of the mere tendency to be unstationary while trying to remain seated on the mower.

Pedal actuated assemblies are also used in adjusting cutting decks relative to the mower frame. Such assemblies regularly provide components including a handle or other hardware which automatically locks the deck in a given position upon a full forward extension of the pedal. To enable the locked position, a handle or formation included as part of the actuating assembly has been used to engage with an abutment or slot, respectively, formed as part of the mower's overall construction. While allowing desired securement of the deck in the locked position, it is many times difficult to visually determine the placement of the handle or formation while seated on the mower. The difficulty arises because the operator must exert additional effort in confirming whether the handle or formation is in a locked position since the components are either to the side of the mower's seat or at a distance from the seat, respectively.

Accordingly, there exists a need to provide an indicator as part of a deck adjustment structure whereby the overall assembly allows an operator to position the deck at an easily known elevation above the ground while fully seated on the mower.

SUMMARY OF THE INVENTION

To satisfy the above need, there is provided a lift assembly for controlling the height of the cutting deck relative to the ground and which can be set to either a locked or unlocked position. In causing this setting, an indicator is included as part of the assembly which allows the operator to easily determine the positioning while fully seated on the mower.

To lift and retain the deck at a certain distance above the ground, the present structure consists of a joint cooperation between a pedal actuated adjusting assembly and manually operable latching system. The pedal assembly is mounted to the frame and the cutting deck to permit adjustment of the deck via depression or release of a pedal extending outwardly from the mower cover. Application of force upon the pedal causes a lifting motion in which the deck is raised above the ground surface. Throughout this lifting motion, the deck may be locked into a plurality of positions by an internal latching system mounted with the frame. Upon an application of force sufficient to completely extend the pedal forwardly, a locked position may be accomplished in which the deck may be suitably carried above the ground so as to clear obstacles, such as rocks, sometimes encountered during mowing. The deck may be maintained in this locked position by an interconnection of the latching system and the adjustment assembly whereby a latch included as part of the system holds the adjustment assembly and hence, the deck, in place. Any locked position in which the deck may be held can also be used in the instance in which it is desired to remove the cutting deck from the mower. However, it is preferred that removal occur while the deck is locked substantially at or below the lowest cut height.

In an effort to assist in latching the deck into position, means such as a manually actuated lever such as a handle or pedal extending outwardly from the mower cover are contemplated. Use of a handle provides both a mechanism by which the operator may cause the deck to be in a locked or unlocked position as well as an indicator allowing the operator to easily determine the positioning of the deck while seated on the mower. The ease of this determination is made possible since the handle is placed directly in front of the user while seated on the mower and, even more desirable, is within an arm's reach of the operator's touch. While looking at the handle, placement in an upward position indicates a locked position while placement in the alternative downward position signals that the deck is in an unlocked position. In this unlocked position, application of force upon the pedal provides for an opportunity to change the cutting height of the mower whereby release of such force will then permit the adjustment assembly to rest against a height of cut adjuster to establish an even cut height for the mower.

Thus, a user of the above lift assembly cannot only expend minimal amounts of effort in achieving adjustment of the deck, but can also easily determine the height of that adjustment above the ground surface.

DESCRIPTION OF THE PREFERRED EMBODIMENT

Figure 1:
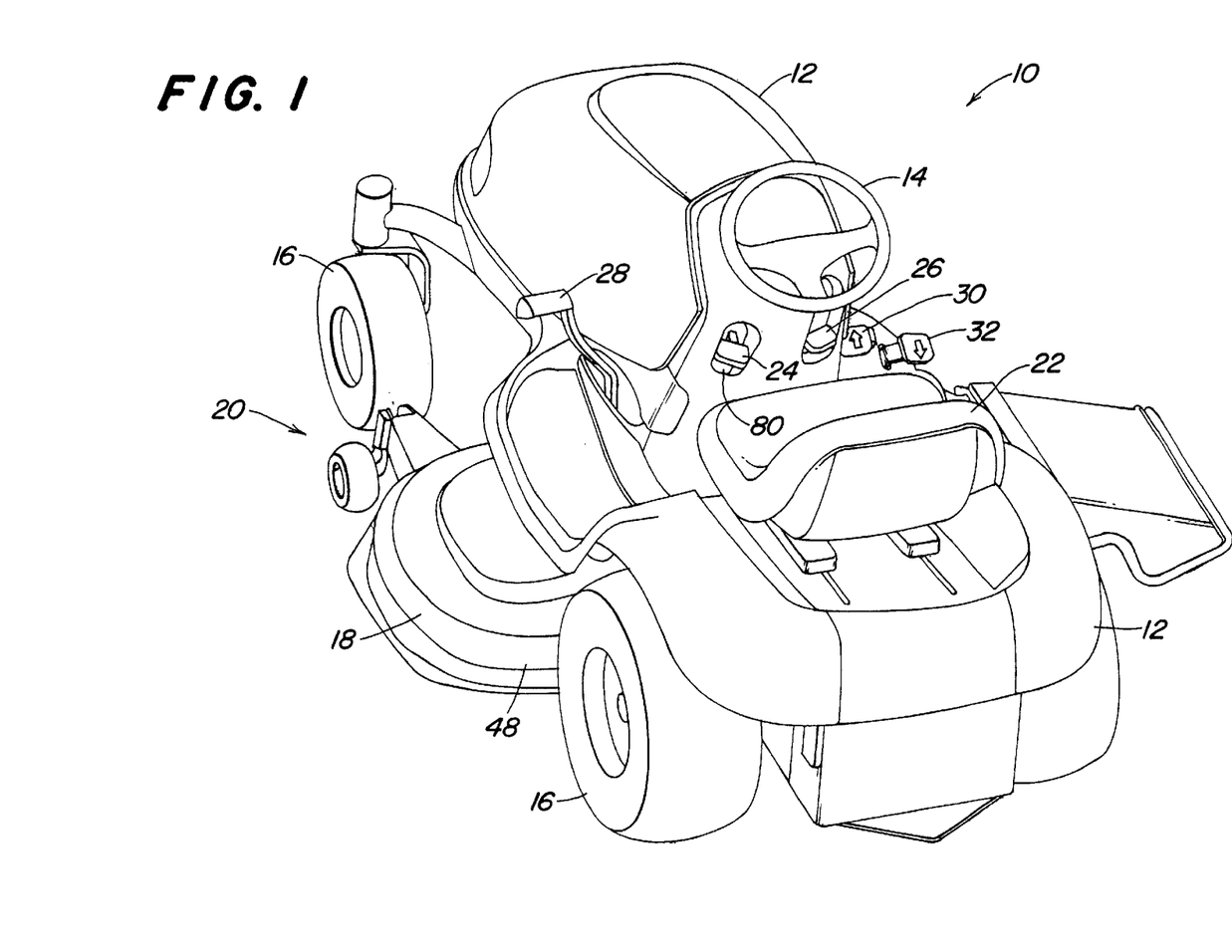
FIG. 1 is a top elevated perspective view of a riding mower displaying the operator controlled elements of the lift assembly of the present invention.

As shown in FIG. 1, there is illustrated a riding mower 10 having a cover 12, steering wheel 14, wheels 16, and an attached cutting deck 18 having ground wheel assemblies 20 adapted to serve as anti-scalp wheels. Also attached with the mower is a seating apparatus 22 for accommodating an operator. Positioned directly in front of the seat are manually operable handles 24,26 on both the operator's left and right hand side, respectively, when looking forwardly of the seat 22. To the left of the seat 22, there is provided a pedal 28 for use in adjusting the height of cutting deck 18 above the surface of the ground. To the right of the seat are shown two drive pedals 30,32, one indicating forward motion and the other indicating rearward motion, both pedals made available for controlling the mower's drive direction when in use. controlling the mower's drive direction when in use.

Figure 2:
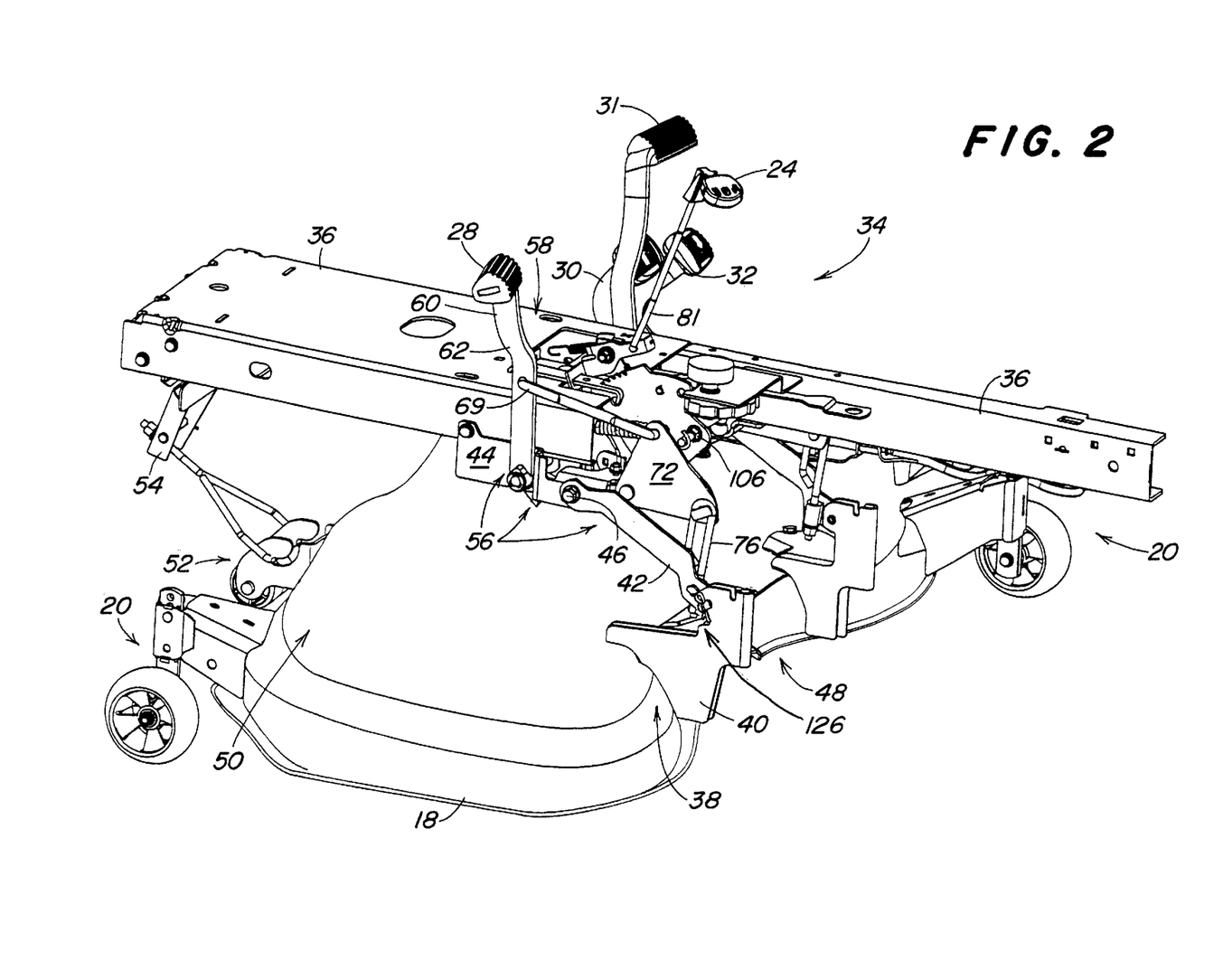
FIG. 2 is an elevated side perspective view of the frame and attached cutting deck of the mower displaying internal components of the lift assembly.

Shown in FIG. 2 is the lift assembly 34 according to the present invention in a locked position in which the deck 18 may be removed from the mower frame 36. Provided on a top-rear side surface 38 of deck 18 are slotted brackets 40. Fitting within brackets 40 are draft arms 42 used to connect deck 18 with frame 36. Arms 42 pivotally connect to mounting plates 44 and are secured to plates 44 by conventional means 46 such as a bolt and nut combination. Means 46 assist in holding arms 42 to plates 44 when a rear portion 48 of deck 18 is adjusted. A front portion 50 of deck 18 is held to frame 36 during adjustment by a tensioned cable 51 attached to center ground engaging wheels 52 and front bracket 54.

Figure 3:
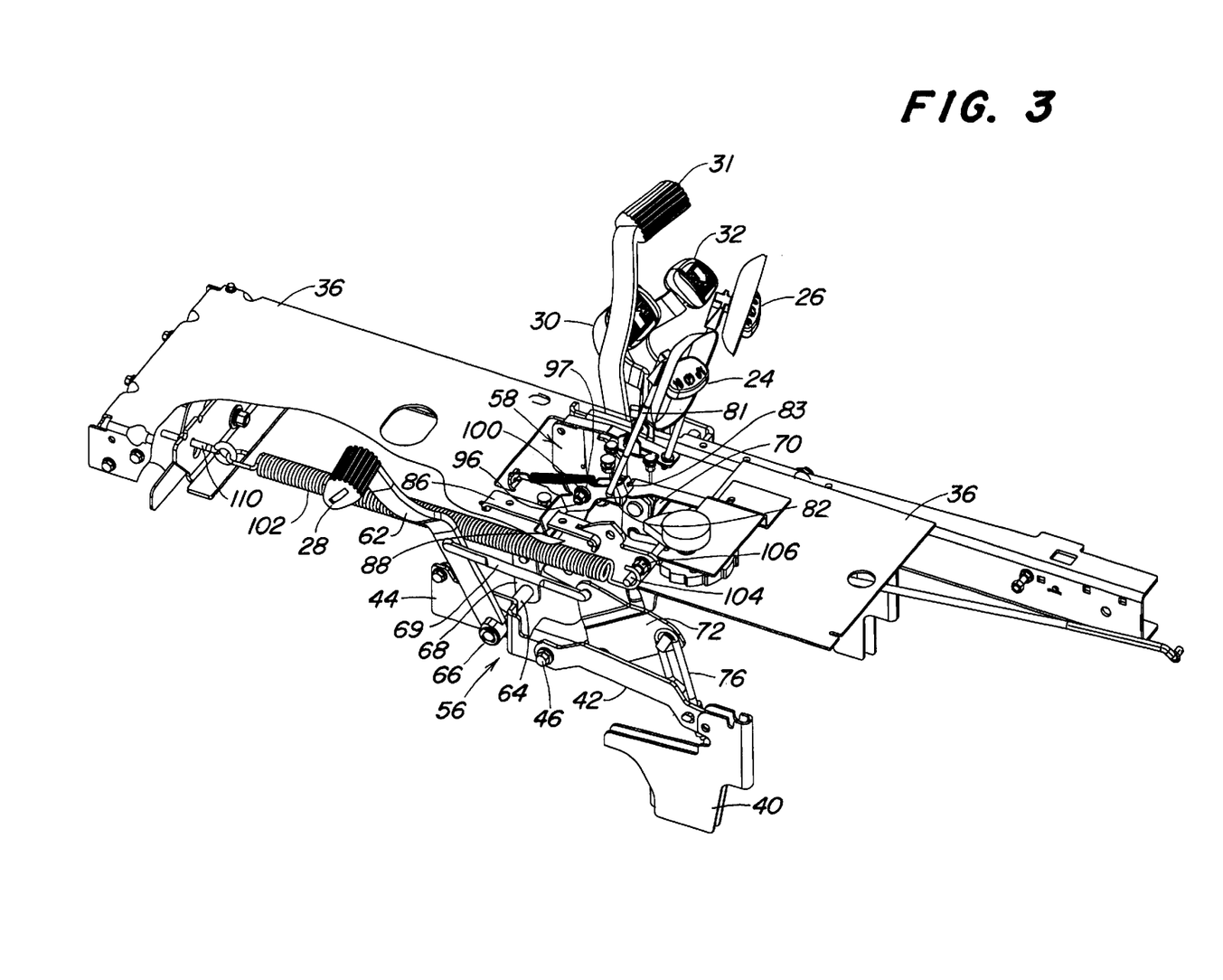
FIG. 3 is a rear perspective view according to the present invention and having a broken away portion showing an underside of the mower frame.
Figure 5:
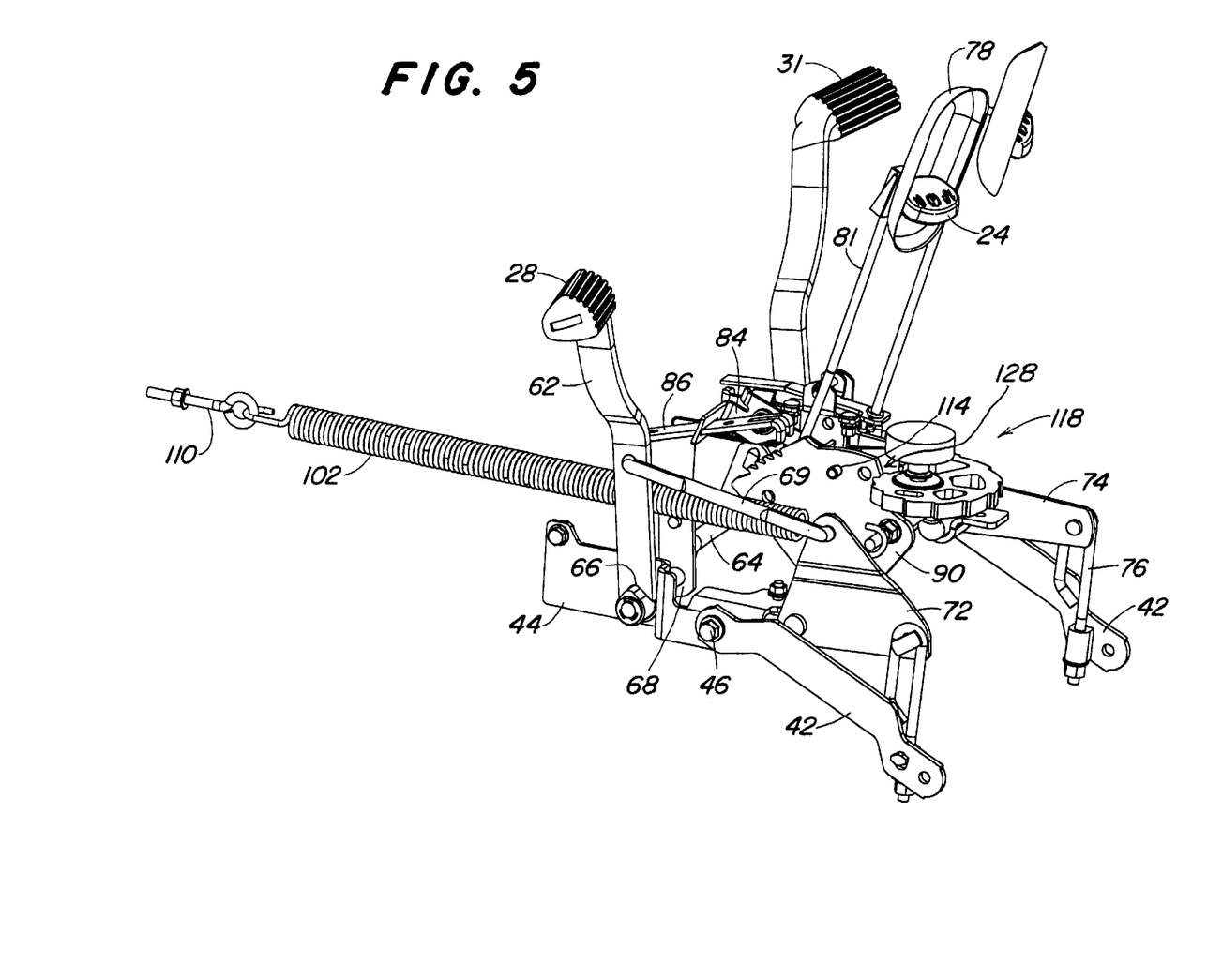
FIG. 5 is an elevated side perspective view of the lift assembly in an unlocked position suitable for mowing.
Figure 6:
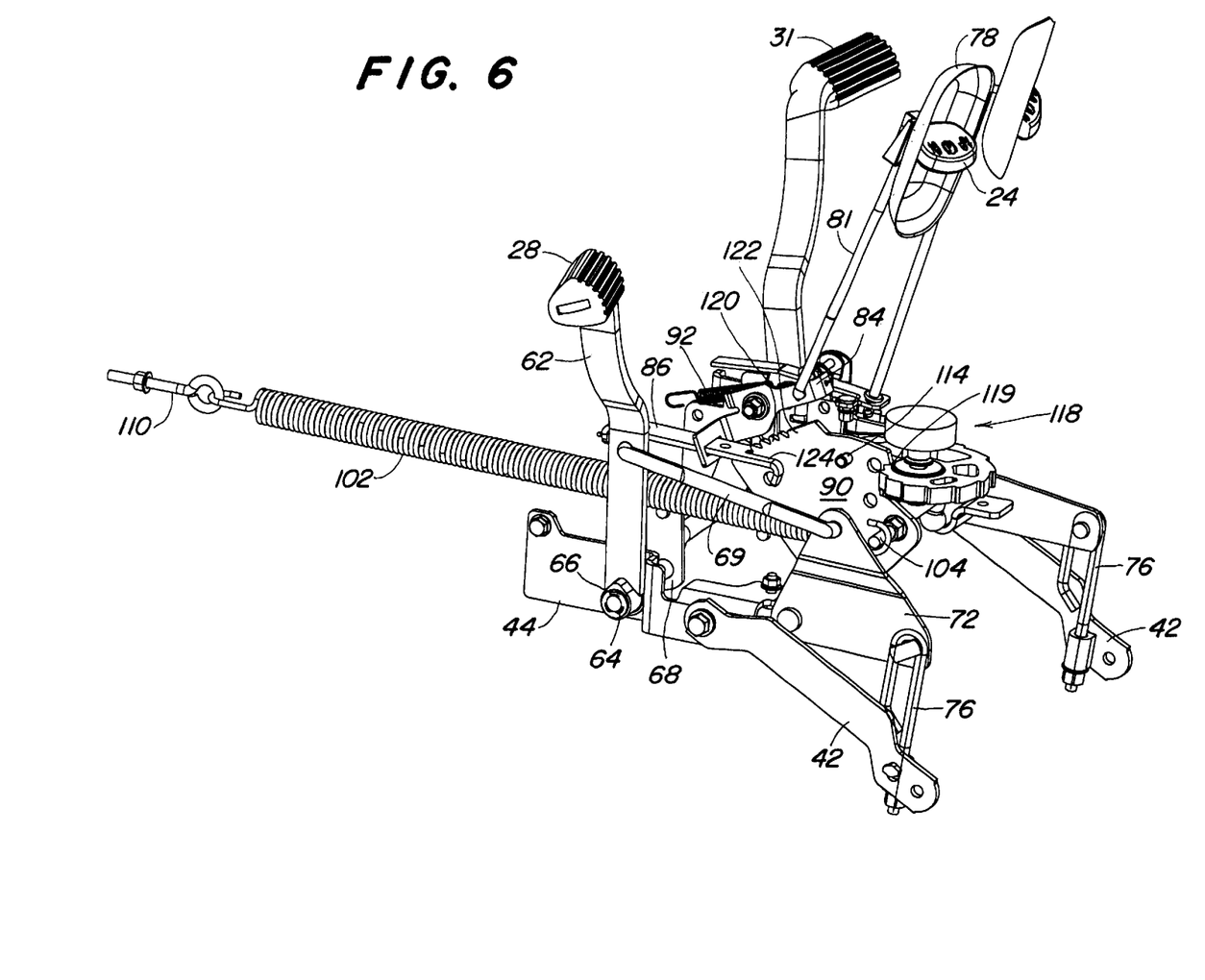
FIG. 6 is an elevated side perspective view of the lift assembly in a locked position suitable for removal of the deck from the mower.
Figure 7:
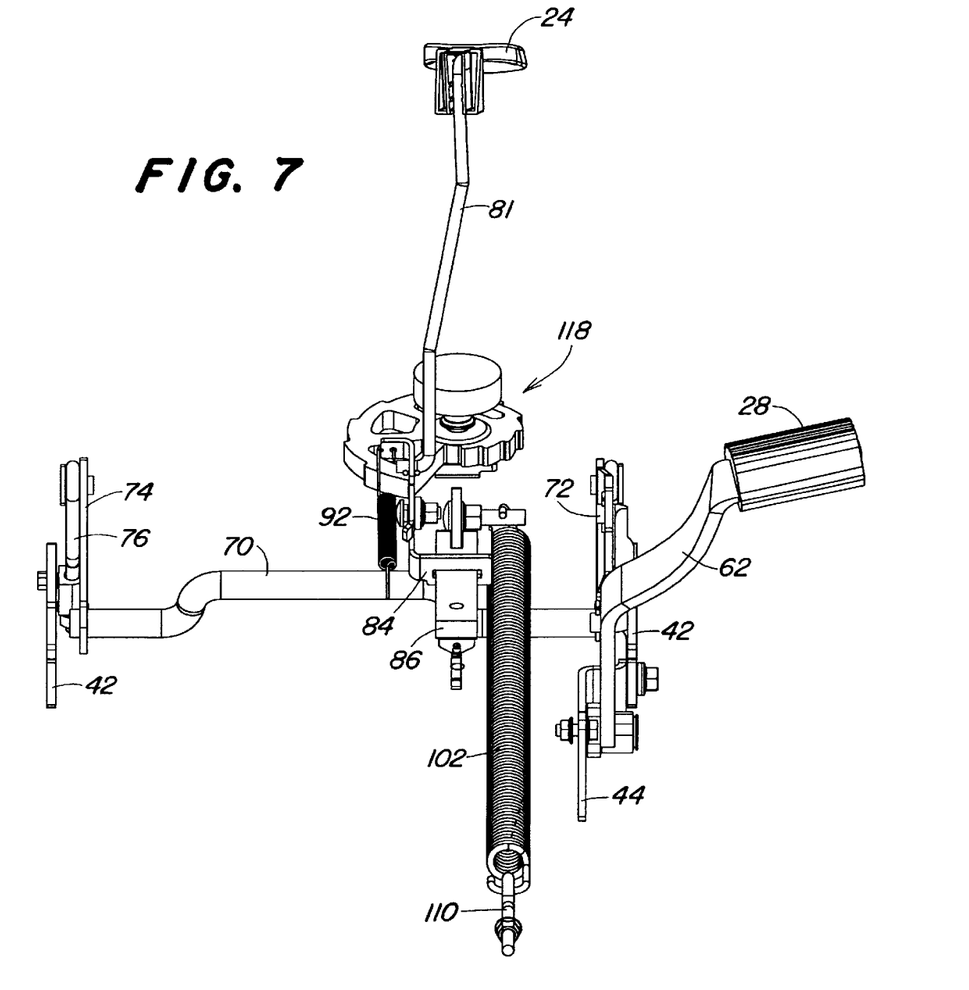
FIG. 7 is a frontal view of the lift assembly in a locked position.
Figure 8:
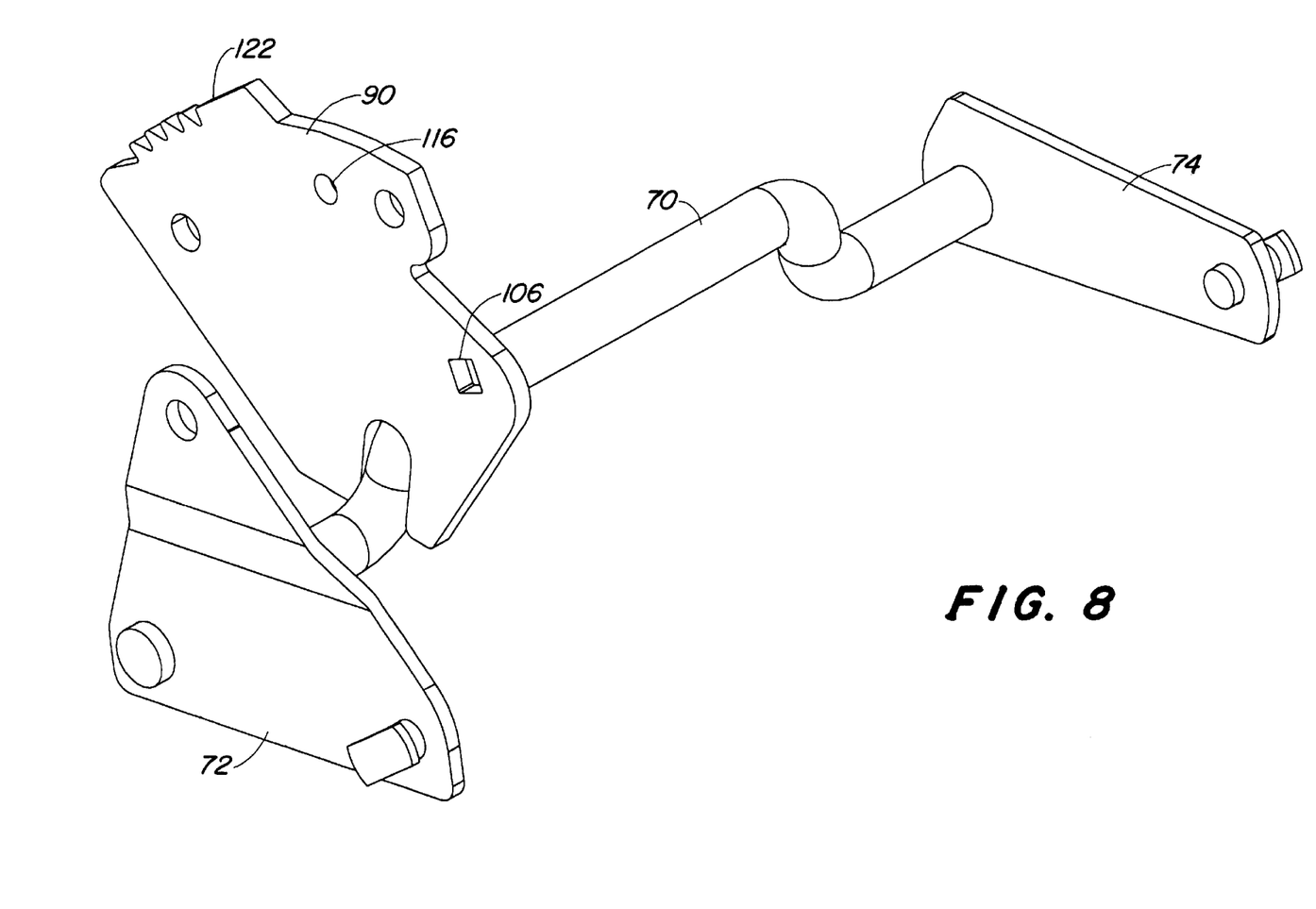
FIG. 8 is an elevated side perspective side view of the rockshaft used in the present invention.

Illustrated throughout FIGS. 2–7 is lift assembly 34 consisting of an adjustment assembly 56 and a latching system 58. Focusing on FIG. 3, adjustment assembly 56 includes pedal 28 attached to an end 60 of a lever 62. Lever 62 is pivotally formed as part of plate 44 via a shaft 64 extending through a cutout 66 formed in plate 44 wherein the shaft 64 further proceeds to connection with a columnar formation 68 provided on an underside of frame 36. As seen in FIGS. 3 and 7, the lever 62 is also joined by a rod 69 to a rockshaft 70, shown separately in FIG. 8, having left and right plates 72, 74 connected by lift links 76 to arms 42 so as to permit movement of deck 18 upon an application of force on pedal 28. Looking to FIGS. 3 and 4, latching system 58 includes handle 24 partially housed in a cup 78 provided to fit within an opening 80 of cover 12 as shown in FIG. 1. Handle 24 is fixedly connected to a link 81 inserted through a first hole 82 in a lifter 84. Inserted within a slot 88 of lifter 84 is a latch lever 86 used to engage a contact member in the form of a toothed plate 90 formed between plates 72, 74 on rockshaft 70 as part of the adjustment assembly 56. Latching system 58 further includes a spring 92 attached with frame 36 and inserted within another hole 83 in lifter 84 so as to assist in biasing lifter 84 into position upon movement of handle 24. Permitting movement of lifter 84 relative to lever 86 is a pivot pin 96 inserted through still another hole 97 in lifter 84 and secured thereto by a nut 100.

Also shown in FIG. 3 is, preferably, a spring 102 connected to a pin 104 passing through a first hole 106 bored through toothed plate 90 and attached at an opposite end thereof to frame 36 by means of an eyebolt 110. Spring 102 assists in the adjustment of deck 18 above the ground surface upon motioning of pedal 28 in either a forward or rearward direction. In a preferred embodiment, spring 102 is utilized when adjusting the deck 18.

Figure 4:
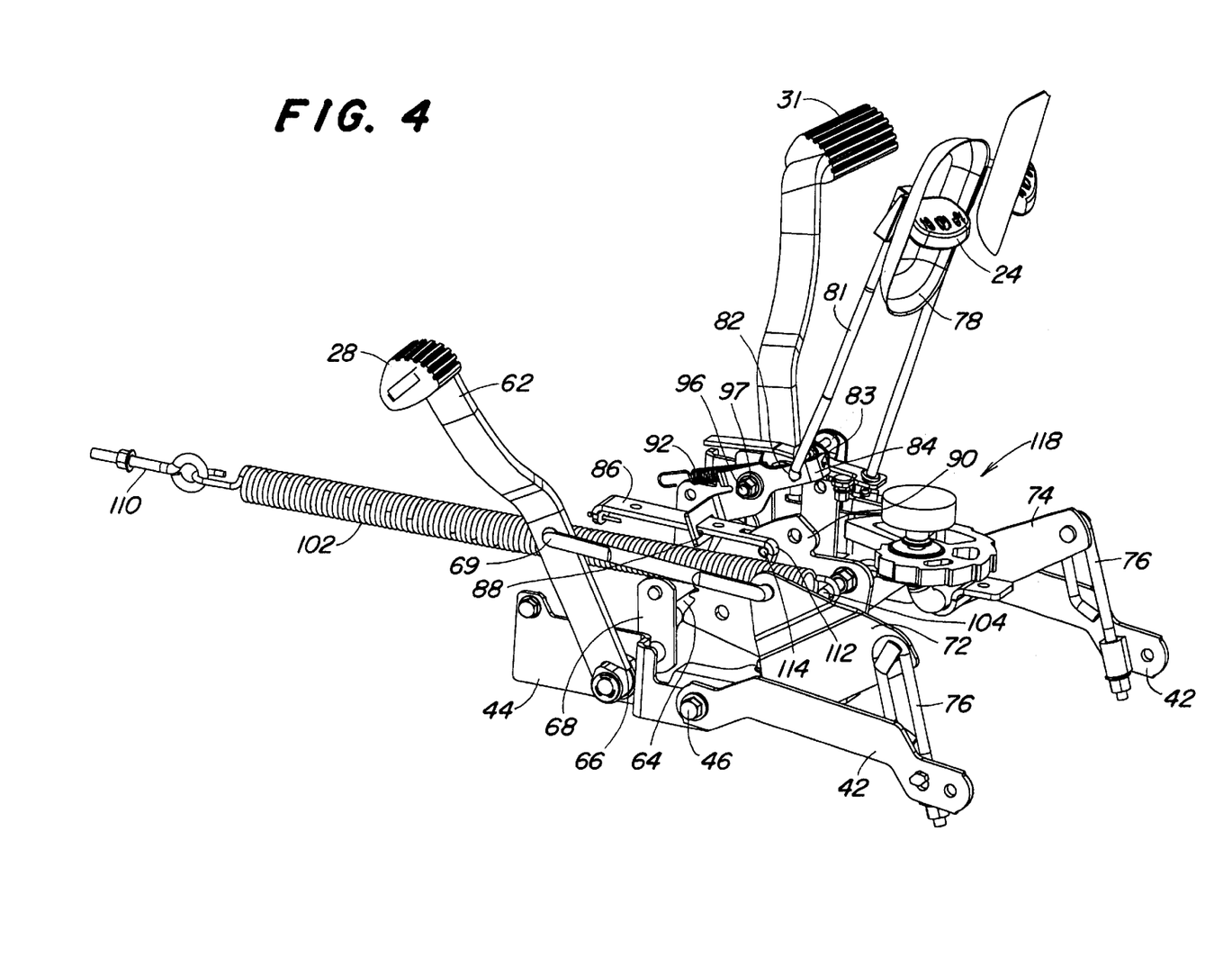
FIG. 4 is a perspective view of the lift assembly in a locked position suitable for transporting the deck above obstacles encountered during mowing.

Adjustment of the deck 18 and maintaining that adjustment within a range of heights extending from a position less than the lowest cut height to a position greater than the highest cut height is depicted in FIGS. 4–6. Shown in FIG. 4 is a cooperation among handle 24 of latching system 58 and pedal 28 of adjustment assembly 56 providing for lifting of deck 18 to a position desirable when the deck needs to clear obstacles encountered when travelling across the ground. In this position, an operator first applies force sufficient to fully extend pedal 28. Application of such force causes rod 69 to pull upon rockshaft 70 whereby this pulling motion then lifts the deck 18 via connection of links 76 to arms 42. During extension of pedal 28, toothed plate 90 is then permitted to rock substantially forwardly of left plate 72. While maintaining the above extension, the operator may then choose to lock deck 18 in place by motioning handle 24 upwardly, this upward motion allowing lifter 84 to pivot upward to force lever 86 downwardly. Upon downward travel of lever 86, a claw portion 112 of lever 86 will catch upon a pin 114 inserted through a second opening 116 constructed in toothed plate 90. As a result of the pin 114 being caught on claw 112, a height of cut adjuster 118 is rendered inactive allowing deck 18 to rise above the highest cut height available wherein this largest height is indicated by the greatest extension on adjuster wheel In comparison to the position of FIG. 4, FIG. 6 depicts a position in which deck 18 may be removed from the mower 10 with ease. Similar to FIG. 4, motioning of handle 24, lifter 84, and latch lever 86 remain the same. However, such motioning may occur when only slight force upon pedal 28 is exerted and then released whereby toothed plate 90 is then permitted to rest against height of cut adjuster 118. Preferably, removal will take place substantially at or below the lowest cut height selection 119 as adjuster 118 is turned counterclockwise. Those skilled in the art will recognize that removal may occur at any height at which adjuster 118 may be set although it is preferred that removal of the deck take place when it is positioned near the lowest cut height adjustment for the reason(s) discussed below. In the removal position, latch lever 86 is forced into engagement with a notch 120 formed along a second side or edge 122 of toothed plate 90. A fit between lever 86 and notch 120 is permitted by a slot 124 formed at claw 112. Engagement of lever 86 and plate 90 in the manner shown in FIG. 6 permits locking of the plate 90 and hence, deck 18, as previously described. With plate 90 locked into engagement with the notch 120, spring 102 is no longer of any effect in terms of its ability to cause rotation of rockshaft 70 and lifting of deck 18. Accordingly, when retaining means 126, such as the pin and spring combination shown in FIG. 2, is removed, rockshaft 70 is prevented from advancing forwardly to a position in which deck 18 would be thrust upwardly. Additionally, allowing rockshaft 70 to remain in position enables deck 18 to be re-installed with the same ease and at the same position made available upon its removal. deck 18 to be re-installed with the same ease and at the same position made available upon its removal.

Focusing now on FIG. 5, lift assembly 34 is shown in a released position in which ordinary mowing operation is preferred. In this case, handle 24 is pressed downwardly so as to pivot lifter 84 downwardly as an operator releases force upon pedal 28. As pivoting of lifter 84 relative to lever 86 occurs, as shown in FIG. 5, lever 86 is taken out of engagement with toothed plate 90 permitting spring 102 to assist in returning a first side 128 of toothed plate 90 into abutment with height of cut adjuster 118. Further extension of pedal 28 will release force applied upon adjuster 118 by toothed plate 90 allowing an operator the opportunity to rotate adjuster 118 either clockwise or counterclockwise to set a desired cut height.

With the instant invention, there is provided an easy to use lift assembly for a mower cutting deck that can be either locked or unlocked into position above the ground surface, depending upon an operation's preference. The indication of either of these positions well be the same for both the lift handle 25 and brake handle 26. As seen in FIG. 3, when both handles are raised, an operator can determine that the lift assembly 34 and brake pedal 31 are locked in position, and unlocked when lowered. In either the locked or unlocked position, mowing can occur should the operator choose to do so. Additionally, the assembly provided a pedal allowing the operator to minimize the amount of effort needed to cause the adjustment of the deck above the ground.

While the present invention has been described in conjunction with a specific embodiment, it is understood that many alternatives, modifications, and variations will be apparent to those skilled in the art in light of the foregoing description. Accordingly, this invention is intended to embrace all such alternatives, modifications and variations which fall within the spirit and scope of the appended claims.

We claim:

1. A mower comprising:
   a) a cover having a plurality of openings therein;
   b) a seat positioned on a top surface of the cover, one of the plurality of openings being positioned opposite the seat;
   c) a frame disposed beneath the cover;
   d) a cutting deck attached to the frame;
   e) a height of cut adjuster connected with the frame;
   f) a pedal actuated adjustment assembly connected with the frame and the deck for adjusting the height of the cutting deck relative to the frame and including
      a shaft having at least a first plate attached thereto,
      a contact member having at least first and second sides and being attached with the shaft adjacent the first plate,
      a lever having a pedal on an end thereof, the first plate and the lever being joined to each other for movement of the first plate and the contact member upon movement of the pedal,
      a spring extending between the contact member and the frame for allowing biased movement of the deck upon movement of the pedal, an application of force upon the pedal causing forward movement of the contact member relative to the frame and away from the height of cut adjuster and an absence of force upon the pedal allowing the contact member to rest against the height of cut adjuster on the first side thereof, the contact member providing a surface, on the second side thereof, for selective and lockable cooperation with
   g) a manually operable latching system for positioning the deck in one of a plurality of positions relative to the frame and holding the deck in one of the plurality of positions so as to restrain movement of the deck against further movement thereof.

2. The mower as recited in claim 1 wherein:
   the latching system includes a handle, protruding from the cover, for securing the deck in one of the plurality of positions.

3. The mower as recited in claim 2 wherein:
   the latching system further includes a lever associated with the handle and being operable upon vertical movement of the handle to either secure the deck in a locked position or release the deck from the locked position.

4. The mower as recited in claim 3 wherein:
   the lever includes a claw portion on an end thereof.

5. The mower as recited in claim 4 wherein:
   the contact member carries a pin therewith, the claw portion being engageable with the pin to cause a first locked position in response to forward movement of the pedal, the forward movement thereof enabling vertical movement of the deck.

6. The mower as recited in claim 5 wherein:
   the contact member includes notched portions on the second side thereof, the claw portion being engageable with at least one of the notched portions for establishing at least a second locked position.

7. A mower comprising:
   a) a cover having a plurality of openings therein;
   b) a seat positioned on a top surface of the cover, one of the plurality of openings being positioned opposite the seat;
   c) a frame disposed beneath the cover;
   d) a cutting deck attached to the frame;
   e) a height of cut adjuster connected with the frame;
   f) a pedal actuated adjustment assembly connected with the frame and the deck for adjusting the height of the cutting deck relative to the frame and including
      a shaft having at least a first plate attached thereto,
      a contact member having at least first and second sides and being attached with the shaft adjacent the first plate,
      a lever having a pedal on an end thereof, the first plate and the lever being joined to each other so as to cause movement of the first plate and the contact member upon movement of the pedal,
      a first arm pivotally attaching the frame and the deck and a first link extending from the first plate to connect the first plate to the first arm for lifting the deck upon movement of the pedal,
      a spring extending between the contact member and the frame for allowing biased movement of the deck upon movement of the pedal, an application of force upon the pedal causing forward movement of the contact member relative to the frame and away from the height of cut adjuster and the absence of force upon the pedal allows the contact member to rest against the height of cut adjuster on the first side thereof, the contact member providing a surface, on the second side thereof, for selective and lockable cooperation with
   g) a manually operable latching system for positioning the deck in one of a plurality of positions relative to the frame and holding the deck in one of the plurality of positions so as to restrain movement of the deck against further movement thereof.

8. The mower as recited in claim 7 wherein:
   the latching system includes a handle, protruding from the cover, for securing the deck in one of the plurality of positions.

9. The mower as recited in claim 8 wherein:

the latching system further includes a lever associated with the handle and being operable upon vertical movement of the handle to either secure the deck in a locked position or release the deck from the locked position.

10. The mower as recited in claim 9 wherein:

the lever includes a claw portion on an end thereof.

11. The mower as recited in claim 10 wherein:

the contact member carries a pin therewith, the claw portion being engageable with the pin to cause a first locked position in response to forward movement of the pedal, the forward movement thereof enabling vertical movement of the deck.

12. The mower as recited in claim 11 wherein:

the contact member includes notched portions on the second side thereof, the claw portion being engageable with at least one of the notched portions for establishing at least a second locked position.

\* \* \* \* \*